(12) United States Patent
Chayat et al.

(10) Patent No.: US 10,433,035 B2
(45) Date of Patent: Oct. 1, 2019

(54) PROFILES FOR COLLECTING TELEMETRY DATA

(71) Applicant: Intel Corporation, Santa Clara, CA (US)

(72) Inventors: Ronen Chayat, Haifa (IL); Andrey Chilikin, Limerick (IE); John J. Browne, Limerick (IE); Chris MacNamara, Co. Limerick (IE); Tomasz Kantecki, Ennis (IE)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 15/476,077

(22) Filed: Mar. 31, 2017

(65) Prior Publication Data

US 2018/0288503 A1 Oct. 4, 2018

(51) Int. Cl.
*H04Q 9/02* (2006.01)
(52) U.S. Cl.
CPC ........... *H04Q 9/02* (2013.01); *H04Q 2209/70* (2013.01)
(58) Field of Classification Search
CPC .............................. H04Q 9/02; H04Q 2209/70
See application file for complete search history.

(56) References Cited

U.S. PATENT DOCUMENTS

| | | | | |
|---|---|---|---|---|
| 5,404,555 | A * | 4/1995 | Liu | G06F 9/38 712/202 |
| 6,023,507 | A | 2/2000 | Wookey | |
| 7,609,650 | B2 | 10/2009 | Roskowski et al. | |
| 9,497,039 | B2 * | 11/2016 | Greenberg | H04L 12/4633 |
| 2006/0206698 | A1 | 9/2006 | Foucher et al. | |
| 2016/0248689 | A1 | 8/2016 | Akhbarizadeh et al. | |
| 2018/0020477 | A1 * | 1/2018 | Neubacher | H04Q 9/00 |

FOREIGN PATENT DOCUMENTS

WO 2016122022 A1 8/2016

OTHER PUBLICATIONS

The International Searching Authority, "Notification of Transmittal of the International Search Report and the Written Opinion of the International Searching Authority" dated Jun. 28, 2018 in international application No. PCT/US2018/022591.

* cited by examiner

*Primary Examiner* — Ryan W Sherwin
(74) *Attorney, Agent, or Firm* — Trop, Pruner & Hu, P.C.

(57) ABSTRACT

An apparatus includes telemetry registers, a memory, and a virtualized telemetry controller. The memory may store a set of telemetry profiles, including a first telemetry profile specifying a collection trigger, a set of telemetry registers, and a telemetry data destination. The virtualized telemetry controller may be to: detect a condition satisfying the collection trigger specified in the first telemetry profile; in response to a detection of the condition, read telemetry values from the set of telemetry registers specified in the first telemetry profile; generate a telemetry container including the telemetry values; and send the telemetry container to the telemetry data destination specified in the first telemetry profile.

20 Claims, 6 Drawing Sheets

PROFILES FOR COLLECTING TELEMETRY DATA

BACKGROUND

A networked system can include any number of computing devices connected by communication links. A computing device may include a central processing units (CPUs) and main memory (e.g., random-access memory). Further, a computing device may include various components such as a graphics accelerator, a network interface card, a display, and so forth. Such components may be connected to a data bus of the computing device.

DETAILED DESCRIPTION

Some networked systems may use telemetry data to describe a state or characteristic of a source electronic device. Such telemetry data may be provided to a remote destination for use in monitoring the source device. For example, a datacenter may include multiple computing devices (e.g., servers) and networking devices (e.g., switches). A destination entity (e.g., a network function, a process, a management application, etc.) may collect telemetry data for each source device, such as device status, network load, device temperature, memory usage, and so forth. Further, the destination entity may also collect telemetry data from individual components included in a host device (e.g., network interface card, power supply, module, etc.). As used herein, the term "source device" may refer to a stand-alone electronic device or a component included in a host device. The destination entity may use the telemetry data for any number of uses, including generating status reports, evaluating possible changes to a datacenter, generating billing for datacenter customers, and so forth. In some examples, the destination entity may require multiple telemetry data values to captured at a particular point in time.

Some destination entities may send read requests to read multiple telemetry registers included in a source device. Each telemetry register may be dedicated to store a particular type of telemetry data. Further, each read request may specify a particular telemetry register. As such, multiple read requests may be needed in order to read multiple types of telemetry data. However, the use of multiple read requests may result in significant loads on network and processor bandwidth. Moreover, each read request may be received and/or processed at a different time. Thus, using multiple read requests may result in telemetry data values that are not synchronized to a particular point in time.

In accordance with some embodiments, a source device may include telemetry profiles to provide automated collection of telemetry data. A telemetry profile may be triggered by a specified trigger condition, and may read multiple telemetry values from a set of telemetry registers. The multiple telemetry data values may be included in a container. The container may be encapsulated according to a message profile to generate a telemetry message. As discussed below, in one or more embodiments, the multiple telemetry values in a container may be synchronized to a point in time. As such, some embodiments may improve the time accuracy of the collected telemetry data, including providing atomic capture and time-stamping of the collected data. Further, one or more embodiments may reduce the CPU and/or network bandwidth required in comparison to the use of multiple read requests. Accordingly, some embodiments may provide telemetry collection with high precision and low latency.

In addition, one or more embodiments may provide virtualized collection of telemetry data. As used herein, the term "virtualized collection" refers to data collection in which each destination entity has an independent logical view of the source device. Accordingly, some embodiments may provide a layer of abstraction between a physical source device and multiple destination entities (e.g., virtual machines, virtual network functions, etc.), such that each destination entity can separately and securely monitor telemetry data from the same source device.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software implementations.

Figure 1:
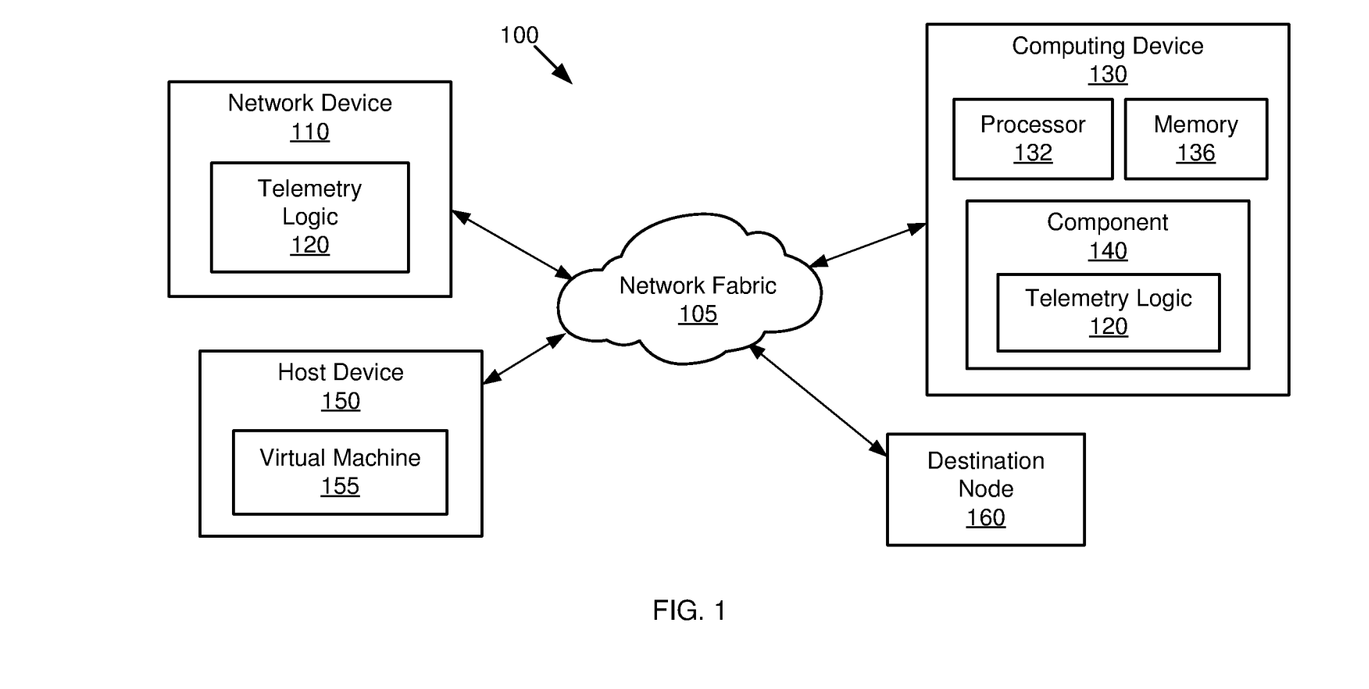
FIG. 1 is a block diagram of an example network in accordance with one or more embodiments.

Referring now to FIG. 1, shown is a block diagram of an example network 100 in accordance with one or more embodiments. In some embodiments, the example network 100 may represent a grouping of related or interconnected devices, such as a datacenter, a computing cluster, a Local Area Network (LAN), a Wide Area Network (WAN), and so forth.

As shown in FIG. 1, the example network 100 may include any number and type of devices connected by a network fabric 105, including a network device 110, computing device 130, host device 150, and destination node 160. In some embodiments, the network device 110 may be a stand-alone device, such as a switch, a sensor, a camera, an appliance, and so forth. Further, in other embodiments, the network device 110 may be part of a host device (e.g., a network interface card (NIC) or host fabric interface (HFI) included in host device 150). In some embodiments, the host device 150 may host a virtual machine 155.

In one or more embodiments, the computing device 130 may include a processor 132, memory 136, and a component 140. For example, the computing device 130 may be a server, a blade computer, a laptop, a tablet, and so forth. In some embodiments, the component 140 may be a component device that is installed or embedded in the computing device 130 to provide some functionality to the computing device 130. For example, the component 140 may be a NIC, a HFI, an accelerator module, an intellectual property (IP) block, a storage device, a graphics device, a power supply, and so forth.

In one or more embodiments, the network device 110 may include telemetry logic 120 to generate telemetry data associated with the network device 110. Examples of such telemetry data may include link statistics, system statistics, access control list statistics, system status, temperature level, power consumption data, and so forth. In some embodiments, the telemetry logic 120 may use profiles specifying triggers, source registers, and destinations for telemetry data. The telemetry logic 120 may generate a telemetry container including multiple types of telemetry data, and may send the telemetry container to a destination entity specified in a profile. In some embodiments, a telemetry container may be a data structure stored in memory (e.g., memory 136) and/or transmitted in a network fabric (e.g., network fabric 105).

In one or more embodiments, the telemetry logic 120 may send a telemetry container to destinations across external networks and/or local data buses. For example, assume that the virtual machine 155 is to receive multiple types of telemetry data associated with the network device 110. Accordingly, the telemetry logic 120 in the network device 110 may generate and send a telemetry container to the virtual machine 155 via a network link (e.g., Ethernet). In a second example, assume that the destination node 160 is to receive multiple types of telemetry data describing the component 140. Accordingly, in the second example, the telemetry logic 120 in the component 140 may generate and send a telemetry container to the destination node 160 via a network link. In a third example, assume that the computing device 130 is to receive multiple types of telemetry data describing the component 140. Accordingly, in the third example, the telemetry logic 120 in the component 140 may generate and send a telemetry container to a location (e.g., a buffer) in the memory 136 via a local data bus of the computing device 130 (e.g., a Peripheral Component Interconnect (PCI) bus).

Figure 2:
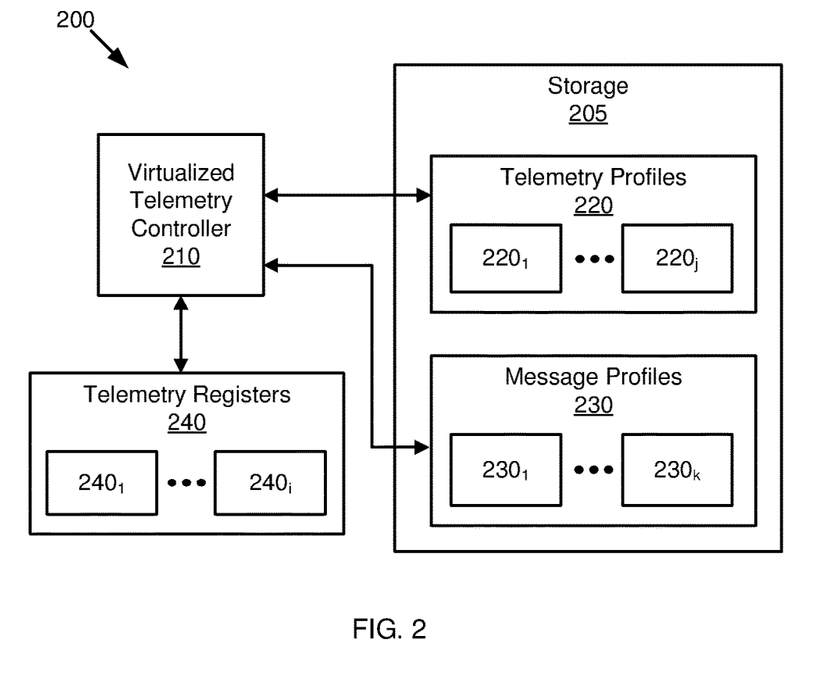
FIG. 2 is a block diagram of an example of telemetry logic in accordance with one or more embodiments.

Referring now to FIG. 2, shown is a block diagram of an example telemetry system 200 in accordance with some embodiments. In some examples, the system 200 may correspond generally to some or all of the telemetry logic 120 shown in FIG. 1. As shown, the system 200 may include a virtualized telemetry controller 210, storage 205, and a set of telemetry registers 240. The virtualized telemetry controller 210 may be implemented in one or more hardware components. For example, the virtualized telemetry controller 210 may be a general purpose processor executing instructions that implement telemetry control, an application-specific integrated circuit (ASIC), a programmable logic block such as a field-programmable gate array (FPGA), and so forth. In some embodiments, the storage 205 may include a set of telemetry profiles 220 and a set of message profiles 230. The storage 205 may be non-volatile storage (e.g., flash memory) or volatile storage (e.g., RAM).

In one or more embodiments, the telemetry registers 240 may be any memory locations to store multiple types of telemetry data associated with a source device (e.g., network device 110 or component 140 shown in FIG. 1). For example, the telemetry registers 240 may be storage locations that are dedicated for telemetry data, a location or range in system memory, and so forth. The telemetry registers 240 may store telemetry data values such as link statistics, system statistics, access control list statistics, system status, load, temperature, device status, timestamp data, packet header data, metadata, etc.

In one or more embodiments, the virtualized telemetry controller 210 may utilize the telemetry profiles 220 to determine triggers, source registers, and destinations for telemetry data. Further, in some embodiments, the virtualized telemetry controller 210 may utilize the message profiles 230 to determine how to package the telemetry data for transmission to the appropriate destination.

In one or more embodiments, the telemetry profiles 220 may be assigned or otherwise associated with any number of entities (e.g., human users, organizations, companies, applications, agents, etc.). By using the telemetry profiles 220, multiple entities can receive separate telemetry data flows for a single source device. For example, referring to FIG. 1, assume that computing device 130 is owned by company A, and that company B leases a virtual machine (not shown in FIG. 1) hosted on the computing device 130. Assume further that company A and company B are assigned telemetry profiles (not shown in FIG. 1) associated with component 140. Thus, in some embodiments, company A and company B can receive separate telemetry data flows or streams to independently monitor the performance of component 140.

In one or more embodiments, the virtualized telemetry controller 210 may provide virtualized collection of telemetry data. For example, the virtualized telemetry controller 210 may provide a layer of abstraction between a physical source device (e.g., component 140) and multiple destination entities (e.g., entities associated with company A and company B). Further, the virtualized telemetry controller 210 may provide each destination entity with a separate logical view of the source device. Accordingly, multiple destination entities can independently receive telemetry data from the same source device.

In one or more embodiments, a source device including the telemetry logic 120 (e.g., computing device 130 shown in FIG. 1) may be pre-packaged with the telemetry profiles 220 and/or the message profiles 230. For example, the telemetry profiles 220 and/or the message profiles 230 may be stored in the storage 205 at the time of manufacture of the source device.

In some embodiments, the telemetry profiles 220 and/or the message profiles 230 may be customizable. For example, the virtualized telemetry controller 210 may provide an interface to allow a user to specify parameters or fields in a telemetry profile 220 (e.g., triggers, source registers, destinations, etc.) or a message profile 230 (e.g., network headers, message format, etc.)

Figure 3:
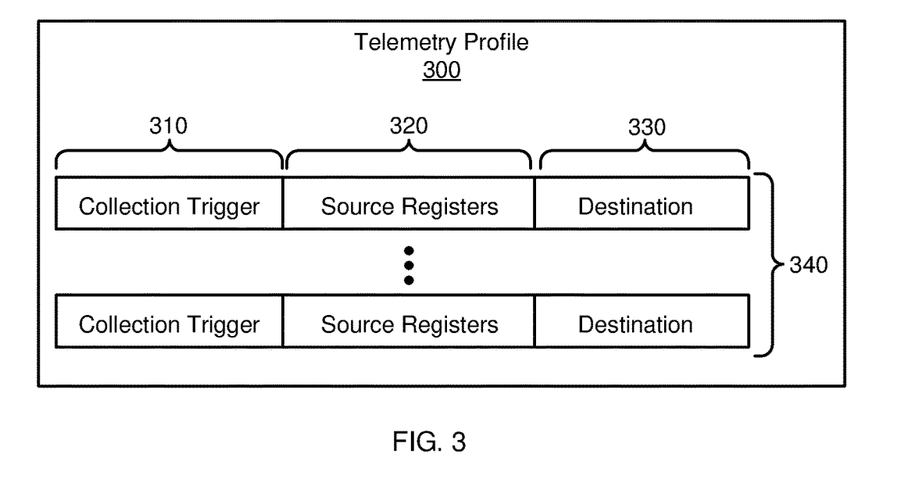
FIG. 3 is a block diagram of an example telemetry profile in accordance with one or more embodiments.

Referring now to FIG. 3, shown is a block diagram of an example telemetry profile 300 in accordance with some embodiments. The telemetry profile 300 may correspond generally to an example embodiment of one of the telemetry profiles 200 (shown in FIG. 2).

As shown in FIG. 3, the telemetry profile 300 may include one or more relationships 340. In some embodiments, each relationship 340 may include a collection trigger field 310, a source register field 320, and a destination field 330. The collection trigger field 310 may specify one or more conditions to trigger the collection of telemetry data. For example, the collection trigger field 310 may specify a periodic timer, a control signal, an interrupt, a device status, a processing exception, a register flag, a system state, a trigger packet, and so forth. In some embodiments, the collection trigger field 310 may specify a rule to trigger data collection. For example, a rule may specify that data collection is triggered for every packet received, for every N packets, for a given percent of packets in a random distribution, and so forth.

In one or more embodiments, the virtualized telemetry controller 210 (shown in FIG. 2) may perform monitoring according to the collection trigger field 310 of each telemetry profile 300, and may detect satisfaction of the condition(s) specified in collection trigger field 310. For example, the virtualized telemetry controller 210 may determine that a time period specified in the collection trigger field 310 has expired. In another example, the virtualized telemetry controller 210 may determine that a command or exception specified in the collection trigger field 310 has occurred.

In one or more embodiments, when the condition(s) specified in the collection trigger field 310 are satisfied, telemetry data is read from the telemetry registers specified in the associated source registers field 320. Note that, because multiple telemetry registers may be read in response to a trigger being satisfied, the collected telemetry data values may be synchronized to a point in time. Accordingly, some embodiments may provide a telemetry "snapshot" corresponding to a given point in time. In some embodiments, the collected telemetry data values may be timestamped using a clock or timer.

In one or more embodiments, the collected telemetry data may be included in a telemetry container. The telemetry container may be sent to the destination specified in the associated destination field 330. For example, the destination field 330 may specify a network address, a memory address, a register, a process identifier, an application, a Virtual Machine (VM), a Virtual Network Function (VNF), a destination device, a hardware component, and so forth. In some embodiments, the destination field 330 may also specify or indicate a message profile (e.g., message profile 230 shown in FIG. 2) used to package or encapsulate the telemetry container.

Figure 4:
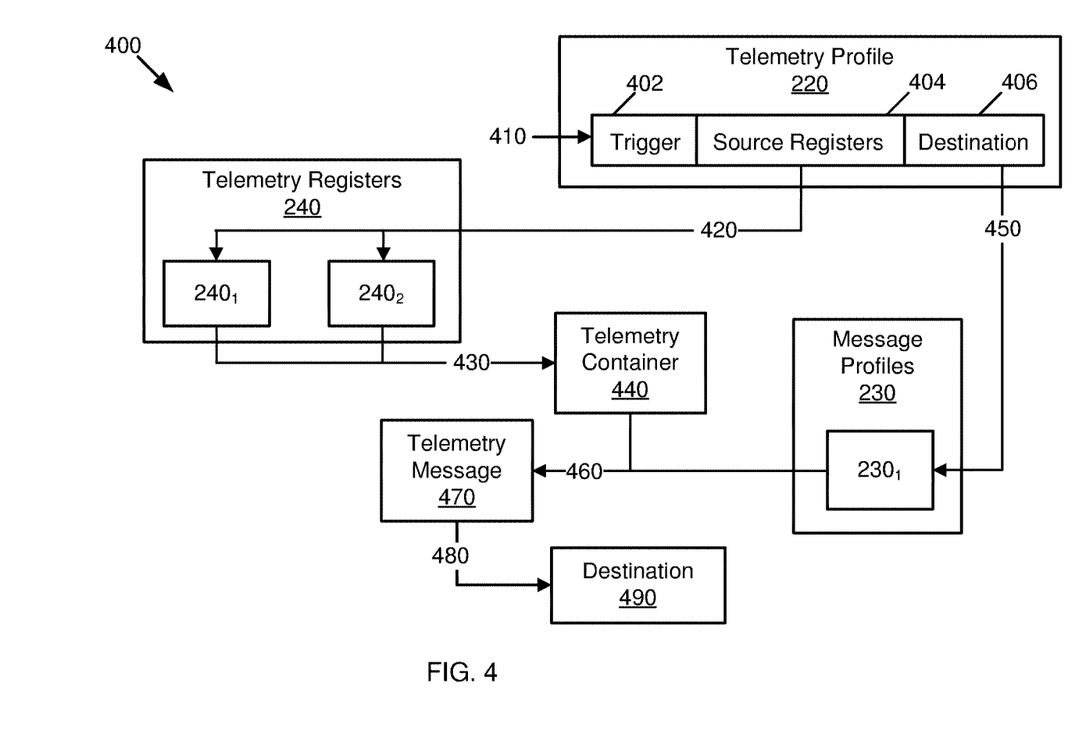
FIG. 4 is a block diagram of an example telemetry operation in accordance with one or more embodiments.

Referring now to FIG. 4, shown is a block diagram of an example telemetry operation 400 in accordance with some embodiments. In various embodiments, the telemetry operation 400 may be performed by the virtualized telemetry controller 210 (shown in FIG. 2).

At a first point in time, a trigger matching a collection trigger field 402 in a telemetry profile 220 may be detected 410. In response, the source register field 404 in the telemetry profile 220 may be used to identify 420 the associated telemetry registers $240_1$ and $240_2$. The telemetry data in the telemetry registers $240_1$ and $240_2$ may be read to generate 430 a telemetry container 440.

In some embodiments, the destination field 406 in the telemetry profile 220 may be used to identify 450 the associated message profile $230_1$. The telemetry container 440 may be packaged according to the message profile $230_1$ to generate a telemetry message 470. The telemetry message 470 may be sent 480 to the specified destination 490. For example, assume that the destination 490 specified in destination field 406 is a remote node that is accessed over an Internet Protocol (IP) network. Accordingly, the message profile $230_1$ may specify the appropriate encapsulation for the telemetry container 440 to generate a telemetry message 470 that is compatible with the IP network. Such encapsulation may include headers such as MAC, IP, UDP, etc. In another example, assume that the destination 490 specified in destination field 406 is a buffer in local memory (e.g., memory 136 shown in FIG. 1). Accordingly, the message profile $230_1$ may specify a format of the telemetry message 470 that is compatible with a Direct Memory Access (DMA) transfer to the destination buffer in memory.

Figure 5:
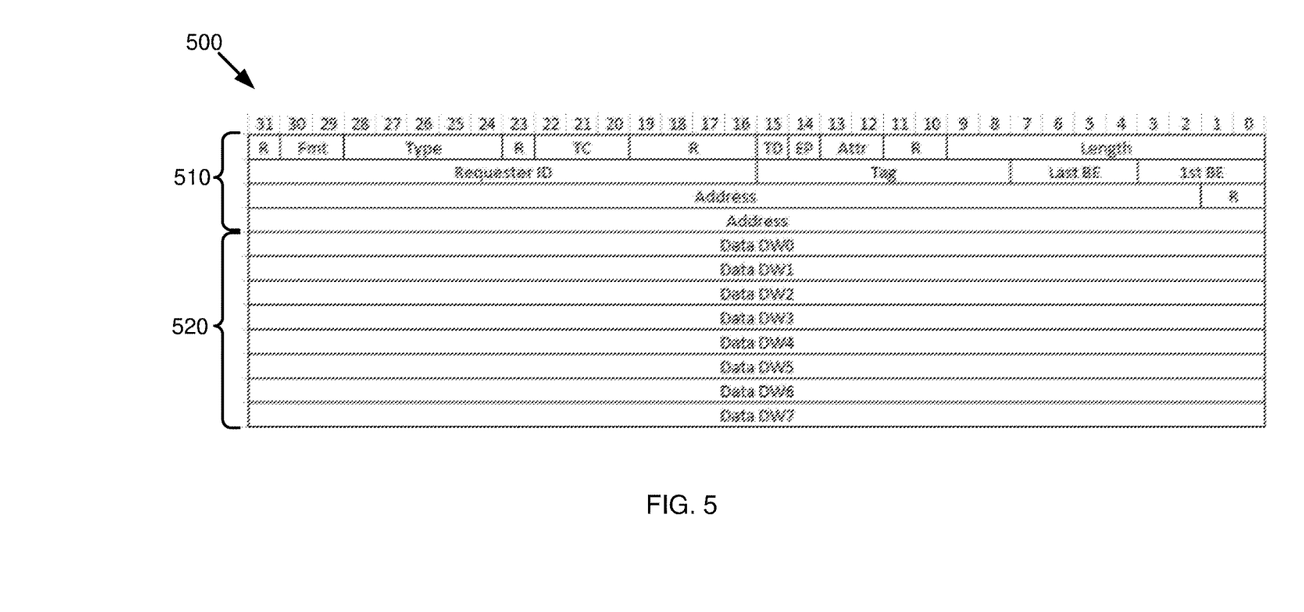
FIG. 5 is an example telemetry container in accordance with one or more embodiments.

Referring now to FIG. 5, shown is an example telemetry container 500 in accordance with some embodiments. The telemetry container 500 may correspond generally to an example embodiment of the telemetry container 440 (shown in FIG. 4).

In some embodiments, the telemetry container 500 may include a header section 510 and a telemetry data section 520. The header section 510 may include information describing the telemetry container 500, including requester identification, destination address, length, etc. Further, the telemetry data section 520 may include multiple types of telemetry data (shown in FIG. 5 as "Data DW0" to "Data DW7"). In some embodiments, the proportion of telemetry data to header data in the telemetry container 500 is greater than the proportion of telemetry data to header data in multiple responses to read requests. Thus, in some embodiments, the use of the telemetry container 500 may reduce the network bandwidth required in comparison to the use of multiple read requests.

Figure 6:
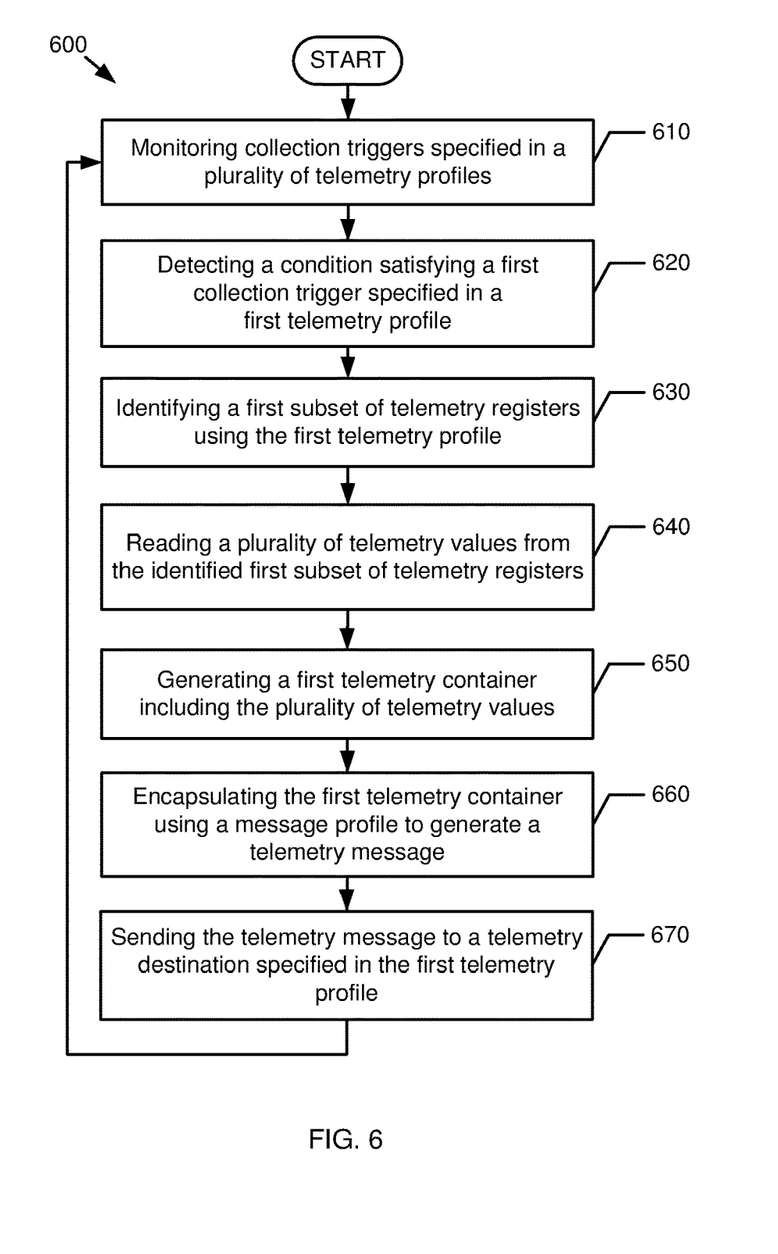
FIG. 6 a flow diagram of an example method in accordance with one or more embodiments.

Referring now to FIG. 6, shown is a flow diagram of an example method 600 in accordance with one or more embodiments. In various embodiments, the method 600 may be performed by processing logic that may include hardware (e.g., processing device, circuitry, dedicated logic, programmable logic, microcode, etc.), software (e.g., instructions run on a processing device), or a combination thereof. In some implementations, the method 600 may be performed using one or more components shown in FIGS. 1-5 (e.g., virtualized telemetry controller 210). In firmware or software embodiments, the method 600 may be implemented by computer executed instructions stored in a non-transitory machine readable medium, such as an optical, semiconductor, or magnetic storage device. The machine-readable medium may store data, which if used by at least one machine, causes the at least one machine to fabricate at least one integrated circuit to perform a method. For the sake of illustration, the actions involved in the method 600 may be described below with reference to FIGS. 1-5, which show examples in accordance with one or more embodiments. However, the scope of the various embodiments discussed herein is not limited in this regard.

At block 610, collection triggers specified in a plurality of telemetry profiles may be monitored. For example, referring to FIG. 2, the virtualized telemetry controller 210 may monitor collection triggers specified in the telemetry profiles 220. In some embodiments, the collection triggers may be specified in the collection trigger fields 310 (shown in FIG. 3)

At block 620, a condition satisfying a first collection trigger specified in a first telemetry profile may be detected. For example, referring to FIGS. 2-4, the virtualized telemetry controller 210 may detect an event or state specified in a collection trigger field 402 in the telemetry profile 220.

At block 630, in response to a detection of the first collection trigger, a first set of telemetry registers may be identified using the first telemetry profile. For example, referring to FIGS. 2-4, the virtualized telemetry controller 210 may access the source register field 404 in the telemetry profile 220 to identify the telemetry registers $240_1$ and $240_2$. The telemetry registers $240_1$ and $240_2$ may be a subset of all telemetry registers 240 included in a source device.

At block 640, a plurality of telemetry values may be read from the identified first set of telemetry registers. For example, referring to FIGS. 2-4, the virtualized telemetry controller 210 may read multiple types of telemetry data stored in the telemetry registers $240_1$ and $240_2$.

At block 650, a first telemetry container including the plurality of telemetry values (read at block 640) may be generated. For example, referring to FIGS. 2-4, the virtualized telemetry controller 210 may generate a telemetry container 440 including the telemetry data read from the telemetry registers $240_1$ and $240_2$.

At block 660, the first telemetry container may be encapsulated using a message profile to generate a telemetry message. For example, referring to FIGS. 2-4, the virtualized telemetry controller 210 may use the destination field 406 in the telemetry profile 220 to identify the message profile $230_1$, and may use the message profile $230_1$ to generate the telemetry message 470.

At block 670, the telemetry message may be sent to a telemetry destination specified in the first telemetry profile. For example, referring to FIGS. 2-4, the virtualized telemetry controller 210 may use the destination field 406 to identify the destination 490, and may send the telemetry message 470 to the destination 490. After block 670, the method 600 may return to block to block 610 to continue monitoring the collection triggers specified in the telemetry profiles.

Figure 7:
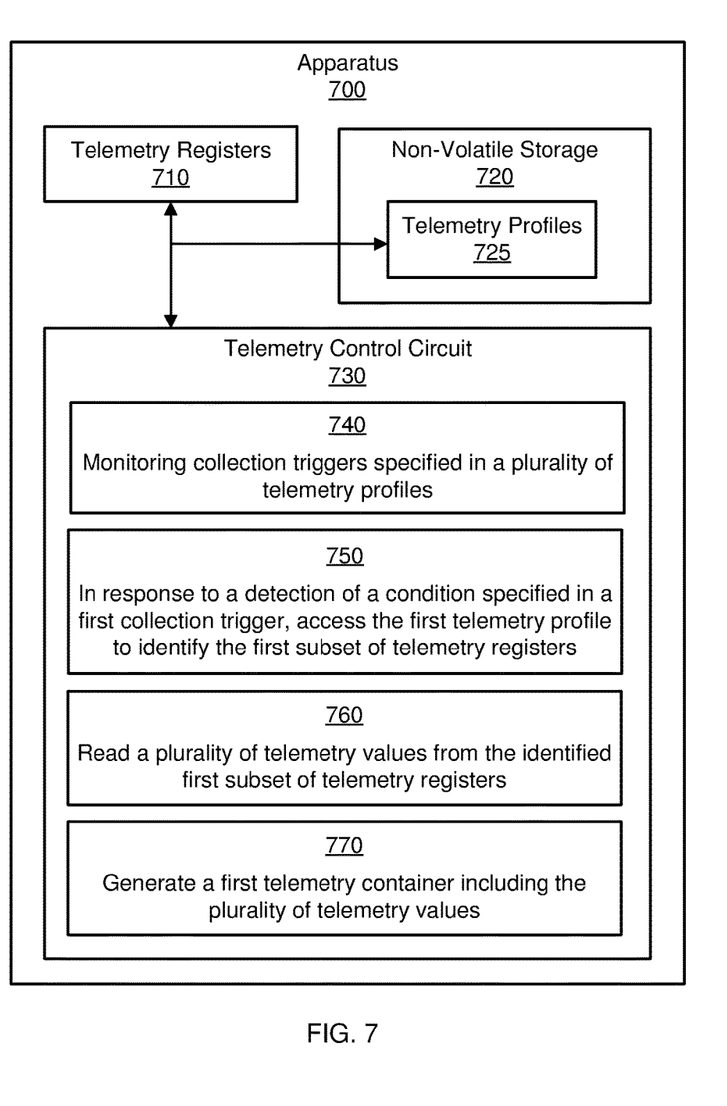
FIG. 7 is a block diagram of an example apparatus in accordance with one or more embodiments.

Referring now to FIG. 7, shown is a block diagram of an example apparatus 700 in accordance with one or more embodiments. In some examples, the apparatus 700 may correspond generally to the network device 110 and/or the computing device 130 shown in FIG. 1. As shown, the apparatus 700 can include telemetry registers 710, non-volatile storage 720, and a telemetry control circuit 730. The telemetry control circuit 730 may correspond generally to an example embodiment of the virtualized telemetry controller 210 (shown in FIG. 2). The non-volatile storage 720 may store telemetry profiles 725. Each of the telemetry registers 710 may store a unique type of telemetry data.

In some embodiments, the telemetry control circuit 730 may perform actions represented by blocks 740-770. At block 740, the telemetry control circuit 730 may monitor collection triggers specified in a plurality of telemetry profiles. At block 750, the telemetry control circuit 730 may, in response to a detection of a first collection trigger, access the first telemetry profile to identify a first set of telemetry registers. At block 760, the telemetry control circuit 730 may read a plurality of telemetry values from the identified first set of telemetry registers. At block 770, the telemetry control circuit 730 may generate a first telemetry container including the plurality of telemetry values.

Note also that, while embodiments may be shown in simplified form for the sake of clarity, embodiments may include any number and/or arrangement of devices and/or components. For example, it is contemplated that some embodiments may include any number of devices or components in addition to those shown, and that different arrangement of the devices or components shown may occur in certain implementations. Furthermore, it is contemplated that specifics in the examples shown in FIGS. 1-7 may be used anywhere in one or more embodiments.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments.

In Example 1, an apparatus for collecting telemetry data may include a plurality of telemetry registers, a memory, and a virtualized telemetry controller. The memory may be to store a plurality of telemetry profiles, the plurality of telemetry profiles including a first telemetry profile specifying a first collection trigger, a first set of telemetry registers, and a first telemetry data destination. The virtualized telemetry controller may be to: detect a first condition satisfying the first collection trigger specified in the first telemetry profile; in response to a detection of the first condition, read a first plurality of telemetry values from the first set of telemetry registers specified in the first telemetry profile; generate a first telemetry container including the first plurality of telemetry values; and send the first telemetry container to the first telemetry data destination specified in the first telemetry profile.

In Example 2, the subject matter of Example 1 may optionally include the plurality of telemetry profiles including a second telemetry profile specifying a second collection trigger, a second set of telemetry registers, and a second telemetry data destination; and the virtualized telemetry controller is further to: detect a second condition satisfying the second collection trigger specified in the second telemetry profile; in response to a detection of the second condition, read a second plurality of telemetry values from the second set of telemetry registers specified in the second telemetry profile; generate a second telemetry container including the second plurality of telemetry values; and send the second telemetry container to the second telemetry data destination specified in the second telemetry profile.

In Example 3, the subject matter of Examples 1-2 may optionally include that the first telemetry profile is assigned to a first entity, and that the second telemetry profile is assigned to a second entity.

In Example 4, the subject matter of Examples 1-3 may optionally include that the virtualized telemetry controller further to provide, using the first telemetry profile and the second telemetry profile, virtualized collection of telemetry data to the first entity and the second entity.

In Example 5, the subject matter of Examples 1-4 may optionally include that the virtualized telemetry controller to: provide a first logical view of the apparatus to the first entity; and provide a second logical view of the apparatus to the second entity.

In Example 6, the subject matter of Examples 1-5 may optionally include that the first telemetry destination is a Virtual Machine (VM).

In Example 6, the subject matter of Examples 1-7 may optionally include that the memory further stores a plurality of message profiles, and the virtualized telemetry controller further to: identify a first message profile associated with the first telemetry data destination; encapsulate the first telemetry container using the identified first message profile to generate a telemetry message; and send the telemetry message to the first telemetry destination specified in the first telemetry profile.

In Example 8, the subject matter of Examples 1-7 may optionally include that
the apparatus further comprises a local memory, where the telemetry destination is a buffer in the local memory, and where the telemetry message comprises Direct Memory Access (DMA) headers.

In Example 9, the subject matter of Examples 1-8 may optionally include that the telemetry destination is a remote device accessed over an Internet Protocol (network), and the telemetry message comprises IP headers.

In Example 10, the subject matter of Examples 1-9 may optionally include that the first collection trigger is an expiration of a period of time.

In Example 11, the subject matter of Examples 1-10 may optionally include that the memory is a non-volatile storage device.

In Example 12, a computer implemented method for collecting telemetry data may include: detecting, by a virtualized telemetry controller of a network device, a first condition satisfying a first collection trigger specified in a first telemetry profile, wherein the first telemetry profile is one of a plurality of telemetry profiles stored in a storage of the network device, the network device including a plurality of telemetry registers, the first telemetry profile further specifying a first set of telemetry registers and a first telemetry data destination; in response to a detection of the first condition, reading a plurality of telemetry values from the first set of telemetry registers specified in the first telemetry profile; generating a first telemetry container including the plurality of telemetry values; and sending the first telemetry container to the first telemetry data destination specified in the first telemetry profile.

In Example 13, the subject matter of Example 12 may optionally include monitoring, by the virtualized telemetry controller, a plurality of collection triggers specified in the plurality of telemetry profiles.

In Example 14, the subject matter of Examples 12-13 may optionally include: identifying a first message profile associated with the first telemetry data destination; encapsulating the first telemetry container using the identified first message profile to generate a telemetry message; and sending the telemetry message to the first telemetry destination specified in the first telemetry profile.

In Example 15, the subject matter of Examples 12-14 may optionally include that the first telemetry profile is assigned to a first entity, a second telemetry profile is assigned to a second entity, and the method further includes providing, based on the first telemetry profile and the second telemetry profile, virtualized collection of telemetry data to the first entity and the second entity.

In Example 16, at least one machine-readable medium may have stored thereon data which, if used by at least one machine, causes the at least one machine to perform operations comprising: monitoring a plurality of collection triggers specified in a plurality of telemetry profiles of an electronic device, the plurality of telemetry profiles including a first telemetry profile specifying an association between a first collection trigger and a first set of telemetry registers, the plurality of telemetry profiles stored in a memory of the electronic device; in response to a detection of the first collection trigger, reading a first plurality of telemetry values from the first set of telemetry registers specified in the first telemetry profile; and generating a first telemetry container including the first plurality of telemetry values.

In Example 17, the subject matter of Examples 16-1 may optionally include that the operations further comprise: identifying a first message profile associated with the first collection trigger; encapsulating the first telemetry container using the identified first message profile to generate a telemetry message; and sending the telemetry message to a first telemetry destination specified in the first telemetry profile.

In Example 18, the subject matter of Examples 16-17 may optionally include that the electronic device is a component included in a computing device, and the first telemetry destination is a buffer in a memory of the computing device.

In Example 19, the subject matter of Examples 16-18 may optionally include that the telemetry message comprises Direct Memory Access (DMA) headers.

In Example 20, the subject matter of Examples 16-19 may optionally include that the first telemetry profile is assigned to a first entity, a second telemetry profile is assigned to a second entity, and the operations further comprise providing, based on the first telemetry profile and the second telemetry profile, virtualized collection of telemetry data to the first entity and the second entity.

In Example 21, an apparatus for collecting telemetry data may include: means for detecting a first condition satisfying a first collection trigger specified in a first telemetry profile, where the first telemetry profile is one of a plurality of telemetry profiles stored in a storage of a network device, the network device including a plurality of telemetry registers, the first telemetry profile further specifying a first set of telemetry registers and a first telemetry data destination; means for, in response to a detection of the first condition, reading a plurality of telemetry values from the first set of telemetry registers specified in the first telemetry profile; means for generating a first telemetry container including the plurality of telemetry values; and means for sending the first telemetry container to the first telemetry data destination specified in the first telemetry profile.

In Example 22, the subject matter of Examples 21-2 may optionally include means for monitoring a plurality of collection triggers specified in the plurality of telemetry profiles.

In Example 23, the subject matter of Examples 21-22 may optionally include means for identifying a first message profile associated with the first telemetry data destination; means for encapsulating the first telemetry container using the identified first message profile to generate a telemetry message; and means for sending the telemetry message to the first telemetry destination specified in the first telemetry profile.

In Example 24, the subject matter of Examples 21-23 may optionally include that the first telemetry profile is assigned to a first entity, a second telemetry profile is assigned to a second entity, and the apparatus further includes means for providing, based on the first telemetry profile and the second telemetry profile, virtualized collection of telemetry data to the first entity and the second entity.

In Example 25, a computing device for collecting telemetry data comprises one or more processors, and a memory having stored therein a plurality of instructions that when executed by the one or more processors, cause the computing device to perform the method of any of Examples 12-15.

In Example 26, at least one machine-readable medium has stored thereon data which, if used by at least one machine, causes the at least one machine to perform the method of any of the Examples 12-15.

In Example 27, an electronic device for collecting telemetry data comprising means for performing the method of any of Examples 12-15.

It is contemplated that various combinations of the above examples are possible. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application. As used herein, "in response to" refers to a direct cause-and-effect relationship.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of telemetry registers;
   a memory to store a plurality of telemetry profiles and a plurality of message profiles, the plurality of telemetry profiles including a first telemetry profile specifying a first collection trigger, a first set of telemetry registers, and a first telemetry data destination; and
   a virtualized telemetry controller to:
      detect a first condition satisfying the first collection trigger specified in the first telemetry profile;
      in response to a detection of the first condition, read a first plurality of telemetry values from the first set of telemetry registers specified in the first telemetry profile;
      generate a first telemetry container including the first plurality of telemetry values;
      identify a first message profile associated with the first telemetry data destination;
      encapsulate the first telemetry container using the identified first message profile to generate a telemetry message; and
      send the telemetry message to the first telemetry data destination specified in the first telemetry profile.

2. The apparatus of claim 1, wherein:
   the plurality of telemetry profiles including a second telemetry profile specifying a second collection trigger, a second set of telemetry registers, and a second telemetry data destination; and
   the virtualized telemetry controller is further to:
      detect a second condition satisfying the second collection trigger specified in the second telemetry profile;
      in response to a detection of the second condition, read a second plurality of telemetry values from the second set of telemetry registers specified in the second telemetry profile;
      generate a second telemetry container including the second plurality of telemetry values; and
      send the second telemetry container to the second telemetry data destination specified in the second telemetry profile.

3. The apparatus of claim 2, wherein the first telemetry profile is assigned to a first destination entity that receives the first telemetry container encapsulated in the telemetry message, wherein the second telemetry profile is assigned to a second destination entity that receives the second telemetry container, wherein the first destination entity is associated with a first organization, and wherein the second destination entity is associated with a second organization.

4. The apparatus of claim 3, the virtualized telemetry controller further to provide, using the first telemetry profile and the second telemetry profile, virtualized collection of telemetry data to the first destination entity and the second destination entity.

5. The apparatus of claim 3, the virtualized telemetry controller to:
   provide a first logical view of the apparatus to the first destination entity; and
   provide a second logical view of the apparatus to the second destination entity.

6. The apparatus of claim 1, wherein the first telemetry destination is a Virtual Machine (VM).

7. The apparatus of claim 1, further comprising a local memory, wherein the telemetry destination is a buffer in the local memory, and wherein the telemetry message comprises Direct Memory Access (DMA) headers.

8. The apparatus of claim 1, wherein the telemetry destination is a remote device accessed over an Internet Protocol (IP) network, and wherein the telemetry message comprises IP headers.

9. The apparatus of claim 1, wherein the first collection trigger is an expiration of a period of time.

10. The apparatus of claim 1, wherein the memory is a non-volatile storage device.

11. A computer implemented method comprising:
   detecting, by a virtualized telemetry controller of a network device, a first condition satisfying a first collection trigger specified in a first telemetry profile, wherein the first telemetry profile is one of a plurality of telemetry profiles stored in a storage of the network device, the network device including a plurality of telemetry registers, the first telemetry profile further specifying a first set of telemetry registers and a first telemetry data destination, wherein the first telemetry profile is assigned to a first entity, and wherein a second telemetry profile is assigned to a second entity;

in response to a detection of the first condition, reading a plurality of telemetry values from the first set of telemetry registers specified in the first telemetry profile;

generating a first telemetry container including the plurality of telemetry values;

sending the first telemetry container to the first telemetry data destination specified in the first telemetry profile; and providing, based on the first telemetry profile and the second telemetry profile, virtualized collection of telemetry data to the first entity and the second entity, wherein the first entity is associated with a first organization, and wherein the second entity is associated with a second organization.

12. The computer implemented method of claim 11, further comprising:
monitoring, by the virtualized telemetry controller, a plurality of collection triggers specified in the plurality of telemetry profiles.

13. The computer implemented method of claim 11, further comprising:
identifying a first message profile associated with the first telemetry data destination;
encapsulating the first telemetry container using the identified first message profile to generate a telemetry message; and
sending the telemetry message to the first telemetry destination specified in the first telemetry profile.

14. At least one non-transitory machine-readable medium having stored thereon data which, if used by at least one machine, causes the at least one machine to perform operations comprising:
monitoring a plurality of collection triggers specified in a plurality of telemetry profiles of an electronic device, the plurality of telemetry profiles including a first telemetry profile specifying an association between a first collection trigger and a first set of telemetry registers, the plurality of telemetry profiles stored in a memory of the electronic device;
in response to a detection of the first collection trigger, reading a first plurality of telemetry values from the first set of telemetry registers specified in the first telemetry profile;
generating a first telemetry container including the first plurality of telemetry values;
identifying a first message profile associated with the first collection trigger;
encapsulating the first telemetry container using the identified first message profile to generate a telemetry message; and
sending the telemetry message to a first telemetry destination specified in the first telemetry profile.

15. The at least one machine-readable medium of claim 14, wherein the electronic device is a component included in a computing device, and wherein the first telemetry destination is a buffer in a memory of the computing device.

16. The at least one machine-readable medium of claim 15, wherein the telemetry message comprises Direct Memory Access (DMA) headers.

17. The at least one machine-readable medium of claim 14, wherein the first telemetry profile is assigned to a first entity, wherein a second telemetry profile is assigned to a second entity, and the operations further comprising:
providing, based on the first telemetry profile and the second telemetry profile, virtualized collection of telemetry data to the first entity and the second entity, wherein the first entity is associated with a first organization, and wherein the second entity is associated with a second organization.

18. An apparatus comprising:
means for detecting a first condition satisfying a first collection trigger specified in a first telemetry profile, wherein the first telemetry profile is one of a plurality of telemetry profiles stored in a storage of a network device, the network device including a plurality of telemetry registers, the first telemetry profile further specifying a first set of telemetry registers and a first telemetry data destination, wherein the first telemetry profile is assigned to a first entity, wherein a second telemetry profile is assigned to a second entity;
means for, in response to a detection of the first condition, reading a plurality of telemetry values from the first set of telemetry registers specified in the first telemetry profile;
means for generating a first telemetry container including the plurality of telemetry values;
means for sending the first telemetry container to the first telemetry data destination specified in the first telemetry profile; and
means for providing, based on the first telemetry profile and the second telemetry profile, virtualized collection of telemetry data to the first entity and the second entity, wherein the first entity is associated with a first organization, and wherein the second entity is associated with a second organization.

19. The apparatus of claim 18, further comprising:
means for monitoring a plurality of collection triggers specified in the plurality of telemetry profiles.

20. The apparatus of claim 18, further comprising:
means for identifying a first message profile associated with the first telemetry data destination;
means for encapsulating the first telemetry container using the identified first message profile to generate a telemetry message; and
means for sending the telemetry message to the first telemetry destination specified in the first telemetry profile.

* * * * *